United States Patent [19]

Usami

[11] Patent Number: 5,268,795
[45] Date of Patent: Dec. 7, 1993

[54] DOOR MIRROR FOR VEHICLE

[75] Inventor: Tadashi Usami, Aichi, Japan

[73] Assignee: Kabushiki Kaisha Tokai Rika Denki Seisakusho, Aichi, Japan

[21] Appl. No.: 899,695

[22] Filed: Jun. 17, 1992

[30] Foreign Application Priority Data

Jun. 19, 1991 [JP] Japan ............................ 3-54797[U]

[51] Int. Cl.$^5$ ............................ G02B 7/18; B60R 1/06
[52] U.S. Cl. ................................. 359/841; 359/872; 359/877; 248/475.1; 248/479
[58] Field of Search ............... 359/841, 871, 872, 874, 359/876, 877; 248/475.1, 479, 549, 900

[56] References Cited

U.S. PATENT DOCUMENTS

| 4,798,967 | 1/1989 | Yamana et al. | 359/841 |
| 4,832,477 | 5/1989 | Torii et al. | 359/877 |
| 4,998,814 | 3/1991 | Perry | 359/871 |
| 5,012,693 | 5/1991 | Enomoto et al. | 359/877 |

FOREIGN PATENT DOCUMENTS

| 0289266 | 11/1988 | European Pat. Off. . | |
| 0244639 | 12/1985 | Japan | 359/877 |
| 0082844 | 4/1988 | Japan | 359/877 |
| 1521538 | 8/1978 | United Kingdom . | |

Primary Examiner—Bruce Y. Arnold
Attorney, Agent, or Firm—Finnegan, Henderson, Farabow, Garrett & Dunner

[57] ABSTRACT

A door mirror including a stay, a bracket that is made of a fiber reinforced synthetic nylon resin having glass fibers that form 50 percent of the total weight and is pivotally disposed on the stay, and a drive unit disposed on the bracket, to which a pair of main mirror bodies are fixed. This configuration reduces the weight of the bracket and the door mirror.

2 Claims, 2 Drawing Sheets

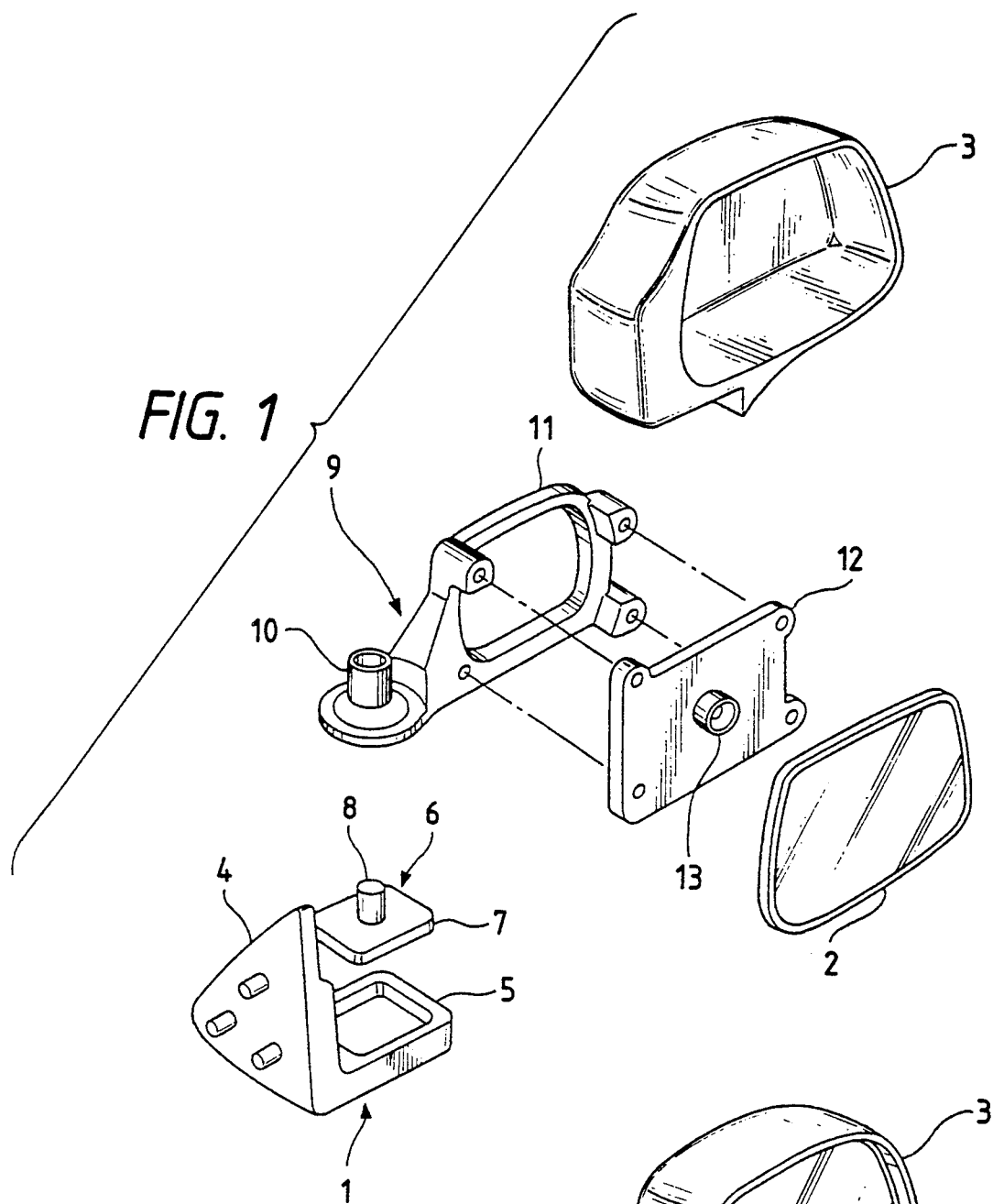

DOOR MIRROR FOR VEHICLE

BACKGROUND OF THE INVENTION

The present invention relates to a door mirror for a vehicle wherein a bracket is pivotally supported by a stay secured to a door of the vehicle.

Generally, a conventional door mirror for a vehicle is constructed such that a main body of the mirror and a mirror housing are supported by a bracket, and moreover, the bracket is supported by a stay secured to the door. In this case, the bracket, which constitutes an essential component of the door mirror, is molded of a metallic material of zinc by employing a die casting process in order to increase the mechanical strength of the whole door mirror.

In the case of the conventional door mirror constructed in the above-described manner, since the bracket is molded of zinc with specific gravity of 6.7 by employing a die casting process, the whole door mirror unavoidably has a heavy weight. For this reason, it is required that the stay for supporting the bracket has a sufficiently high strength, resulting in the stay and associated components being designed in larger dimensions. Consequently, there arises an inconvenience that the whole door mirror should be designed and constructed in a restrictive manner.

In addition, since the bracket is molded of zinc, burs should be removed from the cast bracket. Thereafter, the bracket should be coated with a certain paint, causing it to be produced at an expensive cost. When a vehicle is put in practical use for a long time, there is a possibility that the surface of the bracket will deteriorate.

SUMMARY OF THE INVENTION

The present invention has been made in consideration of the foregoing background and its object resides in providing a door mirror for a vehicle including a bracket as an essential component wherein the weight of the bracket can be reduced, and moreover, a degree of freedom for designing the whole door mirror can be increased.

According to an aspect of the present invention, there is provided a door mirror for a vehicle including a stay secured to a door of the vehicle and a bracket for supporting a main body of a mirror and a mirror housing in such an operative state that the main body and the mirror housing are pivotally supported by the stay, wherein the door mirror is characterized in that the bracket is molded of a synthetic resin.

Since the bracket is molded of a synthetic resin, the weight of the bracket can be reduced substantially. Thus, the stay for supporting the bracket can be designed in smaller dimensions, and moreover, a degree of freedom for designing the whole door mirror can be increased substantially.

In addition, it is not required that burs are removed from the bracket molded of a synthetic resin or the bracket is coated with a certain paint, resulting in the door mirror being produced at a reduced cost.

BRIEF DESCRIPTION OF THE DRAWINGS

FIG. 1 is a perspective view of a door mirror for a vehicle in accordance with an embodiment of the present invention, particularly illustrating the door mirror in the disassembled state.

FIG. 2 is a perspective view of the whole door mirror according to the present invention.

DETAILED DESCRIPTION OF THE PREFERRED EMBODIMENT

Now, the present invention will be described in detail hereinafter with reference to the accompanying drawings which illustrate an embodiment of the present invention. Referring to FIG. 2, which is a perspective view of the whole door mirror, a mirror housing 3 for supporting a main body 2 of a mirror is supported on a stay 1.

Referring to FIG. 1, which is a perspective view of the door mirror in the disassembled state, the L-shaped stay 1 is molded of a metallic material of zinc by employing a die casting process. As is apparent from the drawing, the stay 1 is integrated with a mounting portion 4 to be secured to the door and a supporting portion 5 having a rectangular recess formed thereon. A stand 6 is fitted into the supporting portion 5 of the stay 1. The stand 6 is molded of a metallic material of zinc by employing a die casting process, and a pin 8 stands upright on a rectangular base 7.

A bracket 9 is molded of a fiber reinforced synthetic resin of nylon containing glass fibers in a quantity of 50%. The bracket 9 is constructed such that a rectangular frame-shaped fitting portion 11 is integrated with a cylindrical pivotal portion 10. The pivotal portion 10 is pivotally supported by the pin 8 on the stand 6, whereby the bracket 9 is turnably supported to turn on the stay 6.

A unit drive 12 is fixedly secured to the fitting portion 11 of the bracket 9. The unit drive 12 is provided with a turnable portion 13 adapted to turn in the upward/downward direction or in the horizontal direction as a motor is driven in response to a signal transmitted from the outside. The mirror main body 2 is fixedly secured to the turnable portion 13 of the unit drive 12. With such construction, an angle of the mirror main body 2 varies corresponding to turning movement of the turnable portion 13 on the unit drive 12.

While the bracket 9 is pivotally mounted on the stay 1, the mirror housing 3 is fixedly attached to the bracket 9 for supporting the mirror housing 2. As long as the foregoing state is maintained, the bracket 9 is covered with the mirror housing 3, causing the mirror main body 2 to be exposed to the outside as seen from the mirror housing 3 side.

In contrast with the conventional door mirror having the bracket made of zinc with a specific gravity of 6.7, since the door mirror of the present invention is constructed in the above-described manner, a weight of the door mirror can be reduced by a quantity of about 300 g without any loss of a mechanical strength thereof, because the bracket of the present invention is made of synthetic resin with a specific gravity of 1.6. In this case, it is recommendable that the synthetic resin employed for the bracket 9 is colored with black so as to improve aesthetic appearance of the door mirror. In addition, since the synthetic resin does not rust any longer, there is only a small possibility that the surface of the bracket 9 will deteriorate as time elapses, even though the vehicle is put in practical use for a long time.

As is apparent from the above description, according to the present invention, since the bracket of the door mirror is molded of a synthetic resin, the present invention offers the following advantageous effects. Firstly, a weight of the bracket constituting an essential component of the door mirror can be reduced substantially. Secondly, a degree of freedom for designing the whole door mirror can be increased.

What is claimed is:

1. A door mirror assembly for a vehicle comprising:
   a stay that can be secured to a door of the vehicle;
   a bracket for supporting a mirror and a mirror housing, wherein the bracket is pivotally supported by said stay and is made of a synthetic resin that includes a fiber reinforced synthetic nylon resin having glass fibers that form 50 percent of the total weight of the fiber reinforced synthetic nylon resin.

2. The door mirror assembly of claim 1, wherein said synthetic resin has a specific gravity of 1.6.

* * * * *